H. C. FOLGER.
PIPE HANGER.
APPLICATION FILED JAN. 16, 1909.
934,804.
Patented Sept. 21, 1909.
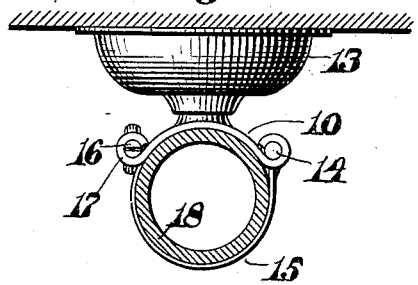
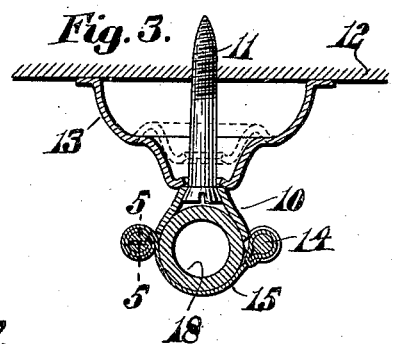
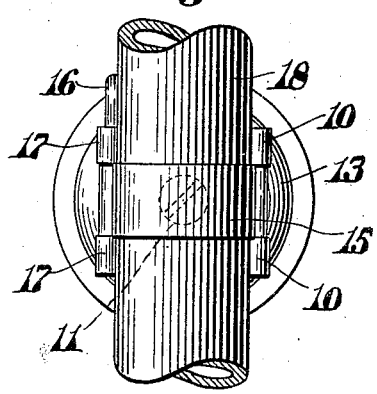
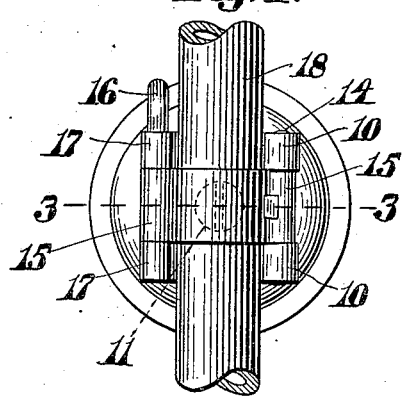
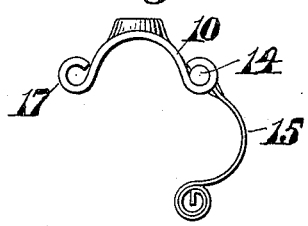
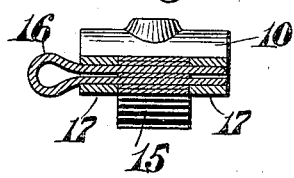
Witnesses:
Nathan C. Lombard
Howard Hanscom
Inventor:
Henry C. Folger,
by Walter E. Lombard.
Atty.

UNITED STATES PATENT OFFICE.

HENRY C. FOLGER, OF MEDFORD, MASSACHUSETTS, ASSIGNOR TO ACME MANUFACTURING COMPANY, OF BANGOR, MAINE, A CORPORATION OF MAINE.

PIPE-HANGER.

934,804.  Specification of Letters Patent.  Patented Sept. 21, 1909.

Application filed January 16, 1909. Serial No. 472,596.

*To all whom it may concern:*

Be it known that I, HENRY C. FOLGER, a citizen of the United States of America, and a resident of Medford, in the county of Middlesex and State of Massachusetts, have invented certain new and useful Improvements in Pipe-Hangers, of which the following is a specification.

This invention relates to a device for supporting pipes and particularly brass pipes.

The object of the device is to provide a simple means for hanging such pipes which may be adjustable to accommodate itself for different sizes of pipes.

The invention consists in certain novel features of construction and arrangement of parts which will be readily understood by reference to the description of the drawings and to the claims hereinafter given.

Of the drawings: Figure 1 represents a plan of a device embodying the features of this invention, showing a pipe supported therein. Fig. 2 represents an elevation of the same, showing therein a section of a pipe. Fig. 3 represents a transverse section of the same, the cutting plane being on line 3—3 on Fig. 4, a pipe of smaller diameter being shown supported thereby. Fig. 4 represents a plan similar to Fig. 1 showing a smaller sized pipe supported in the device. Fig. 5 represents a section of the pipe clamp, the cutting plane being on line 5—5 on Fig. 3, the pipe clamp member being detached from its supporting screw and socket and the pipe being omitted. Fig. 6 represents an end view of the same, the hinged flexible band being shown moved about its hinge and the cotter pin omitted, and Fig. 7 represents an elevation of a cotter pin adapted to be used in connection with the device.

Similar characters designate like parts throughout the several figures of the drawings.

In the drawings 10 is a semi-cylindrical member secured by means of a screw 11 to a wall or ceiling 12, said screw being surrounded by a suitable casing or ornamental rosette 13. The end of the member 10 has hinged thereto by means of a hinge pin 14 a flexible band 15, a portion thereof being coiled about a cotter pin 16 with its extreme end clamped thereby, this end being gripped by the two parallel members of the cotter pin 16 when inserted into the cylindrical bearings 17 formed upon the end of the member 10 opposite to the hinge pin 14. The member 10 is sufficiently flexible so that when various sized pipes are inserted therein and held in position by means of the flexible band 15 it will accommodate itself to the periphery of said pipe and in like manner the rosette or casing 13 surrounding the screw 11 is adapted to be compressed from the form shown in full lines in Fig. 3 when a small pipe is supported by the clamping member into the position shown in dotted lines in said figure when a larger pipe such as is shown in Fig. 2 is supported thereby. When a pipe member is inserted in the member 10 the flexible member 15 is passed partially around the pipe and its free end is inserted into the slit between the two parallel members of the cotter pin 16 which has been inserted into the bearings 17 of the member 10. This cotter pin is then turned in its bearings, taking up any slack that there may be in the flexible band 15, this operation clamping the pipe securely in position. It is obvious that by such a construction a great many sizes of pipes of various dimensions may be supported by devices of this construction without any change of structure, the various elements of the device being adapted to accommodate themselves to the various diameters.

It is believed that the operation and many advantages of the invention will be thoroughly apparent without any further description.

Having thus described my invention, I claim:

1. In a device of the class described, the combination with means for securing it to a wall; of a curved flexible plate; a flexible band secured at one end to said plate; and a cotter pin revoluble in bearings in said plate and adapted to grip the free end of said band, the ends of said pin being normally sprung into engagement with said bearing to prevent its rotation when in adjusted position.

2. In a device of the class described, the combination of a curved plate provided with separated alined bearings at each end and a boss midway of said ends; a securing screw extending through said boss with its head embedded therein; a pin extending through one pair of alined bearings; a headed split pin in the other pair of bearings, the split ends of which are normally separated and sprung into engagement with said bearing to prevent the rotation of said pin when in adjusted position; and a flexible band interposed between each pair of bearings and secured by one end to said first-mentioned pin while its opposite end is extended through the slit in said split pin.

Signed by me at 4 Post Office Sq., Boston, Mass., this 13th day of January, 1909.

HENRY C. FOLGER.

Witnesses:
 EDUN C. CLEVELAND,
 NATHAM C. LOMBARD.